(12) United States Patent
Lee et al.

(10) Patent No.: US 10,133,352 B2
(45) Date of Patent: Nov. 20, 2018

(54) CONTACT SENSITIVE DEVICE, DISPLAY APPARATUS INCLUDING THE SAME AND METHOD OF MANUFACTURING DISPLAY APPARATUS

(71) Applicant: LG DISPLAY CO., LTD., Seoul (KR)

(72) Inventors: YongWoo Lee, Goyang-si (KR); Yong-Su Ham, Seoul (KR); Taeheon Kim, Seoul (KR); YuSeon Kho, Seoul (KR); MyungJin Lim, Goyang-si (KR); Seulgi Choi, Yeonsu-gu (KR)

(73) Assignee: LG DISPLAY CO., LTD., Seoul (KR)

( * ) Notice: Subject to any disclaimer, the term of this patent is extended or adjusted under 35 U.S.C. 154(b) by 81 days.

(21) Appl. No.: 15/355,922

(22) Filed: Nov. 18, 2016

(65) Prior Publication Data

US 2017/0192507 A1 Jul. 6, 2017

(30) Foreign Application Priority Data

Dec. 31, 2015 (KR) .......................... 10-2015-0191053

(51) Int. Cl.
*G06F 3/01* (2006.01)
*B29C 65/48* (2006.01)
(Continued)

(52) U.S. Cl.
CPC .......... *G06F 3/016* (2013.01); *B29C 65/4845* (2013.01); *B32B 7/12* (2013.01); *B32B 37/12* (2013.01); *G06F 3/041* (2013.01); *G06F 3/0412* (2013.01); *B29L 2031/3475* (2013.01); *B32B 2038/0076* (2013.01); *B32B 2307/20* (2013.01); *B32B 2310/0831* (2013.01); *B32B 2457/208* (2013.01); *G06F 2203/04103* (2013.01); *G06F 2203/04112* (2013.01)

(58) Field of Classification Search
CPC .... G06F 3/016; G06F 3/04883; G06F 3/0488; G06F 3/0416; G06F 3/0412; G06F 2203/014; G06F 2203/013
See application file for complete search history.

(56) References Cited

U.S. PATENT DOCUMENTS

2006/0103634 A1* 5/2006 Kim .................. G06F 3/016
  345/173
2010/0328053 A1  12/2010 Yeh et al.
(Continued)

FOREIGN PATENT DOCUMENTS

EP   2908222 A1    8/2015
TW   201710843 A   3/2017
(Continued)

*Primary Examiner* — Koosha Sharifi-Tafreshi
(74) *Attorney, Agent, or Firm* — Dentons US LLP (57) ABSTRACT

Provided is a contact sensitive device. The contact sensitive device includes an electroactive layer, a plurality of first electrodes, a plurality of second electrodes, and a bonding layer. The plurality of first electrodes is disposed on one surface of the electroactive layer and the plurality of second electrodes is disposed on the other surface of the electroactive layer. The bonding layer covers one surface of the electroactive layer and consists of a first part corresponding to the plurality of first electrodes and a second part excluding the first part. The first part and the second part of the bonding layer have different elastic moduli.

14 Claims, 8 Drawing Sheets

(51) Int. Cl.
*B32B 7/12* (2006.01)
*G06F 3/041* (2006.01)
*B32B 37/12* (2006.01)
*B29L 31/34* (2006.01)
*B32B 38/00* (2006.01)

(56) References Cited

U.S. PATENT DOCUMENTS

2014/0104216 A1   4/2014  Adachi et al.
2015/0169118 A1*  6/2015  Lee .................... G06F 3/047
                                            345/174

FOREIGN PATENT DOCUMENTS

TW        201721378 A    6/2017
WO     2015/022938 A1  2/2015

* cited by examiner

CONTACT SENSITIVE DEVICE, DISPLAY APPARATUS INCLUDING THE SAME AND METHOD OF MANUFACTURING DISPLAY APPARATUS

CROSS-REFERENCE TO RELATED APPLICATIONS

This application claims the priority of Korean Patent Application No. 10-2015-0191053 filed on Dec. 31, 2015, in the Korean Intellectual Property Office, the disclosure of which is incorporated herein by reference.

BACKGROUND

Field

The present disclosure relates to a contact sensitive device, a display apparatus including the same, and a method of manufacturing the display apparatus, and more particularly, to a contact sensitive device which provides detailed tactile feedback, a display apparatus including the same, and a method of manufacturing the display apparatus.

Description of the Related Art

A touch device detects a touch input of a user such as screen touch on a display apparatus or gesture and is widely used for a portable display apparatus such as a smart phone or a tablet PC, a display apparatus of public facilities, and a large size display apparatus such as a smart TV. Examples of touch devices include a resistive type, a capacitive type, an optical type, and an electromagnetic (EM) type depending on operating principle.

In addition to a technology of detecting a touch input, a haptic device, which transmits a tactile feedback to the user when a touch input is sensed with a finger or a stylus pen, is being studied. A haptic device to which eccentric rotating mass (ERM) is applied, a haptic device to which a linear resonant actuator (LRA) is applied, a haptic device to which a piezo ceramic actuator is applied, and the like, are being used.

However, these haptic devices are configured by an opaque material and vibrate an entire display apparatus rather than a specific part of the display apparatus. Also, these haptic devices may not provide various vibration feelings, and may be easily broken by an external shock due to low durability.

SUMMARY

The present disclosure has been made in an effort to provide a contact sensitive device, a display apparatus including the same, and a method of manufacturing a display apparatus which may efficiently provide tactile feedbacks subdivided for individual areas.

Objects of the present disclosure are not limited to the above-mentioned objects, and other objects, which are not mentioned above, can be clearly understood by those skilled in the art from the following descriptions.

According to an aspect of the present disclosure, there is provided a contact sensitive device. The contact sensitive device includes an electroactive layer, a plurality of first electrodes, a plurality of second electrodes, and a bonding layer. The bonding layer covers one surface of the electroactive layer and consists of a first part corresponding to the plurality of first electrodes and a second part excluding the first part. The first part and the second part of the bonding layer have different elastic moduli.

According to another aspect of the present disclosure, there is provided a display apparatus. The display apparatus includes a display panel, a contact sensitive device, and a cover window. The contact sensitive device includes a bonding layer which consists of a first part disposed between the first electrode of the contact sensitive device and the cover window and a second part disposed between one surface of the electroactive layer and the cover window. The first part and the second part of the bonding layer have different elastic moduli.

According to another aspect of the present disclosure, there is provided a method of manufacturing a display apparatus. The method includes applying a ultra violet (UV) curing resin onto one surface of an electroactive layer to cover an electrode disposed on one surface of the electroactive layer, disposing a touch device which faces the electroactive layer, on the UV curing resin, irradiating a UV ray having first energy onto the UV curing resin using a first mask which exposes the first area corresponding to the electrode, irradiating a UV ray having second energy which is lower than the first energy onto the UV curing resin using a second mask which exposes the second area excluding the first area in the area corresponding to one surface of the electroactive layer, and bonding a display panel onto the other surface of the electroactive layer.

According to the present disclosure, it is possible to minimize a tactile feedback generated in a specific area to be spread to other areas, so that various tactile feedbacks subdivided for individual areas may be provided.

Further, according to the present disclosure, one UV curable resin is irregularly cured in individual areas so that a bonding layer having different elastic moduli for individual areas is formed. Therefore, a display apparatus which may provide various tactile feedbacks may be provided through a simple manufacturing process.

The effects according to the present disclosure are not limited to the contents exemplified above, and more various effects are included in the present specification.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION OF THE ILLUSTRATED EMBODIMENTS

Advantages and characteristics of the present disclosure and a method of achieving the advantages and characteristics will be clear by referring to exemplary embodiments described below in detail together with the accompanying drawings. However, the present disclosure is not limited to exemplary embodiment disclosed herein but will be implemented in various forms. The exemplary embodiments are provided by way of example only so that a person of ordinary skilled in the art can fully understand the disclosures of the present disclosure and the scope of the present disclosure. Therefore, the present disclosure will be defined only by the scope of the appended claims.

The shapes, sizes, ratios, angles, numbers, and the like illustrated in the accompanying drawings for describing the exemplary embodiments of the present disclosure are merely examples, and the present disclosure is not limited thereto. Like reference numerals generally denote like elements throughout the specification. Further, in the following description, a detailed explanation of known related technologies may be omitted to avoid unnecessarily obscuring the subject matter of the present disclosure. The terms such as "including," "having," and "consist of" used herein are generally intended to allow other components to be added unless the terms are used with the term "only". Any references to singular may include plural unless expressly stated otherwise.

Components are interpreted to include an ordinary error range even if not expressly stated.

When the position relation between two parts is described using the terms such as "on", "above", "below", and "next", one or more parts may be positioned between the two parts unless the terms are used with the term "immediately" or "directly" is not used.

When an element or layer is disposed "on" other element or layer, another layer or another element may be interposed directly on the other element or therebetween.

Although the terms "first", "second", and the like are used for describing various components, these components are not confined by these terms. These terms are merely used for distinguishing one component from the other components. Therefore, a first component to be mentioned below may be a second component in a technical concept of the present disclosure.

Like reference numerals generally denote like elements throughout the specification.

A size and a thickness of each component illustrated in the drawing are illustrated for convenience of description, and the present disclosure is not limited to the size and the thickness of the component illustrated.

The features of various embodiments of the present disclosure can be partially or entirely bonded to or combined with each other and can be interlocked and operated in technically various ways, and the embodiments can be carried out independently of or in association with each other.

In this specification, an electroactive layer refers to a layer in which a shape is changed according to an applied voltage to transmit a vibration feeling.

In this specification, a contact sensitive device refers to a device which transmits a tactile feedback to the user in accordance with a contact of the user onto the contact sensitive device.

Hereinafter, various exemplary embodiments of the present disclosure will be described in detail with reference to accompanying drawings.

Figure 1:
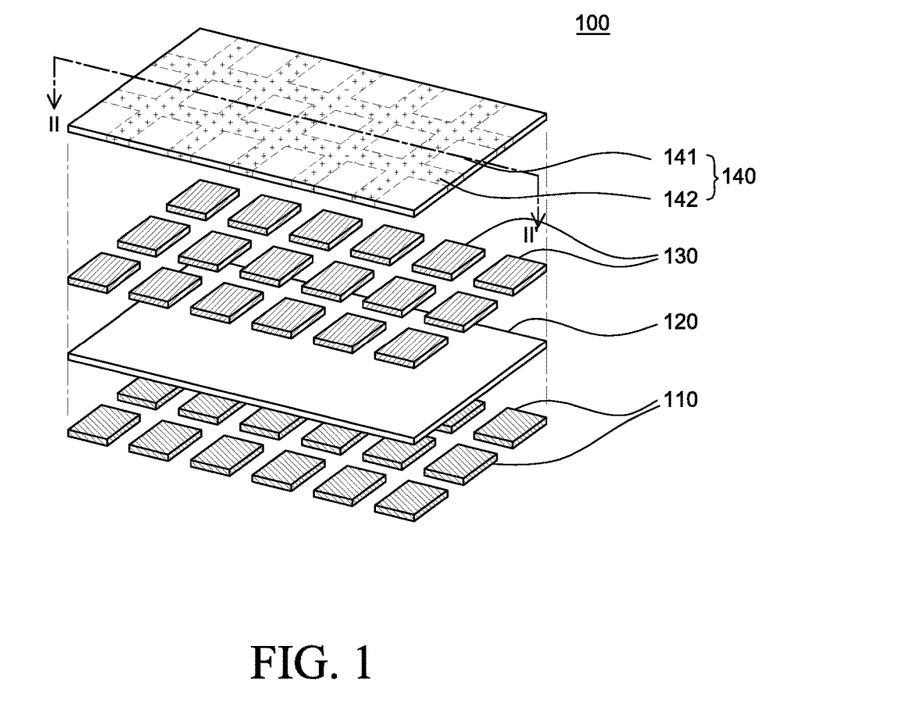
FIG. 1 is a schematic exploded perspective view illustrating a contact sensitive device according to an exemplary embodiment of the present disclosure.
Figure 2:
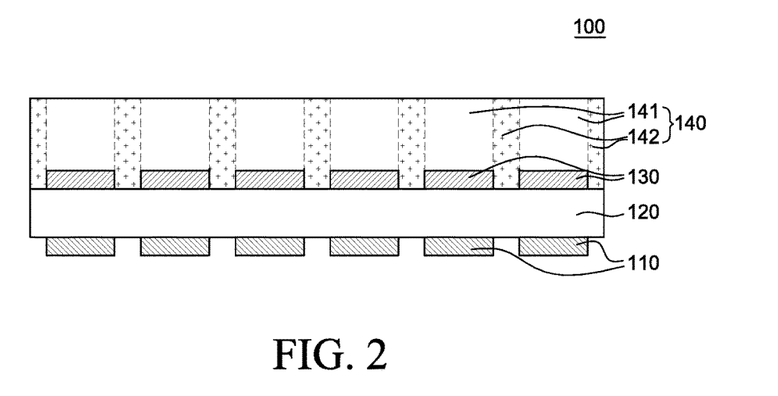
FIG. 2 is a schematic cross-sectional view of a contact sensitive device taken along line II-II' of FIG. 1.

FIG. 1 is a schematic exploded perspective view illustrating a contact sensitive device according to an exemplary embodiment of the present disclosure. FIG. 2 is a schematic cross-sectional view of a contact sensitive device taken along line II-II' of FIG. 1.

Referring to FIGS. 1 and 2, the contact sensitive device 100 includes an electroactive layer 120, a first electrode 130, a second electrode 110, and a bonding layer 140. In FIGS. 1 and 2, wiring lines which are connected to the first electrode 130 and the second electrode 110 are not illustrated for convenience of description.

The electroactive layer 120 is a flat film which is formed of an electroactive polymer, a polymer material modified by electrical stimulation. For example, the electroactive layer 120 may be formed of a dielectric elastomer such as silicon based, urethane based, and acrylic based elastomer, a ferroelectric polymer such as PVDF or P(VDF-TrFE), or a piezo ceramic device.

When the electroactive layer 120 is formed of a dielectric elastomer, the dielectric elastomer contracts or expands due to a Coulombic force generated as a voltage is applied to the electroactive layer 120 so that the contact sensitive device 100 vibrates. Further, when the electroactive layer 120 is formed of a ferroelectric polymer, an alignment direction of dipoles in the electroactive layer 120 changes as the voltage is applied to the electroactive layer 120 so that the contact sensitive device 100 vibrates. Because a film type electroactive layer 120 has excellent transmittance, the contact sensitive device 100 can be attached onto a front surface of a display panel.

A plurality of electrodes are disposed on both surfaces of the electroactive layer 120. For example, the first electrode 130 and the second electrode 110 are disposed on both surfaces of the electroactive layer 120. The first electrode 130 and the second electrode 110 are provided to apply a voltage to the electroactive layer 120 and are formed of a conductive material. Further, in order to secure a high transmittance of the contact sensitive device 100, the first electrode 130 and the second electrode 110 may be formed of a transparent conductive material, such as indium tin oxide (ITO), aluminum doped zinc oxide (AZO), fluorine tin oxide (FTO), or silver nano wire (AgNW). Alternatively, the first electrode 130 and the second electrode 110 may be formed of a metal mesh in which a metal material is disposed in the form of a mesh so that the first electrode 130 and the second electrode 110 can function as a transparent electrode. However, the first electrode 130 and the second electrode 110 are not limited to the above-described examples, but various transparent conductive materials, for example, may be used as a composition material of the first electrode 130 and the second electrode 110. Also, the first electrode 130 and the second electrode 110 may be formed of the same material or different materials.

The first electrode 130 is disposed on one surface of the electroactive layer 120, while the second electrode 110 is disposed on the other surface of the electroactive layer 120. For example, as illustrated in FIG. 1, the first electrode 130 may be disposed above the electroactive layer 120 and the second electrode 110 may be disposed below the electroactive layer.

As illustrated in FIG. 1, the first electrode 130 and the second electrode 110 may be patterned into a plurality of cells. In this case, a plurality of pattern electrodes of the first electrode 130 overlap a plurality of pattern electrodes of the second electrode 110. For example, the plurality of pattern electrodes of the first electrode 130 overlap the plurality of pattern electrodes of the second electrode 110 in one to one correspondence. In this case, an overlapping area where a pair of pattern electrodes of the first and second electrodes 130 and 110 overlap with each other is defined as one tactile cell. Here, the tactile cell is a minimum unit which transmits a tactile feedback to the user, and each tactile cell may independently transmit the tactile feedback.

In some exemplary embodiments, the first electrode 130 includes a plurality of first pattern electrodes extending in a first direction. The second electrode 110 includes a plurality of second pattern electrodes extending in a second direction which intersects the first direction. In this case, an intersecting area where the first pattern electrode and the second pattern electrode intersect may be defined as a tactile cell. Further, the first electrode 130 includes a plurality of first pattern electrodes, each of which has an area corresponding to an area of the tactile cell. The second electrode 110 may be configured by one electrode to cover an entire surface of the electroactive layer 120. In this case, a region where each first pattern electrode is disposed may be defined as a tactile cell.

The area of the tactile cell may be determined in consideration of a finger size of an ordinary person. Since the contact sensitive device 100 transmits a tactile feedback in response to a touch input of the user, the tactile cell which is a minimum unit area which transmits a tactile feedback to the user may be determined in consideration of a region where the touch input of the user is generated. In this case, since the region where the touch input of the user is generated is determined according to a finger size of an ordinary person, the area of the tactile cell may also be determined based on the finger size of an ordinary person.

In some exemplary embodiments, the area of the tactile cell may also be determined in consideration of an area of a touch cell of the touch device which may be used together with the contact sensitive device 100. Here, the touch cell of the touch device refers to a minimum unit which detects a touch input of the user. When the area of the tactile cell is determined in consideration of the area of the touch cell of the touch device, the tactile cell may correspond to the touch cell of the touch device in one to one correspondence. In this case, the contact sensitive device 100 may provide a tactile feedback at a touch location to which a touch input of the user is applied.

Referring to FIG. 2, the bonding layer 140 covers one surface of the electroactive layer 120 and includes a first part 141 and a second part 142. The first part 141 of the bonding layer 140 corresponds to the first electrode 130 disposed on one surface of the electroactive layer 120. The second part 142 of the bonding layer 140 corresponds to an area excluding the area corresponding to the first electrode 130. That is, the first part 141 of the bonding layer 140 is a part of the bonding layer 140 which is disposed on a region where the first electrode 130 is disposed on one surface of the electroactive layer 210. The second part 142 of the bonding layer 140 is a part of the bonding layer 140 which is disposed on a region where the first electrode 130 is not disposed on one surface of the electroactive layer 120.

As described above, the region where the first electrode 130 and the second electrode 110 overlap is defined as a tactile cell. Thus, the first part 141 of the bonding layer 140 is disposed in an area corresponding to the tactile cell and the second part 142 is disposed in an area between the tactile cells.

FIG. 2 illustrates that the first part 141 and the second part 142 are separated from each other by a dotted line for convenience of description, but the first part 141 and the second part 142 form one continuous layer and are formed of the same material. For example, the first part 141 and the second part 142 may be formed of a transparent polymer or a UV curing resin. In this case, the bonding layer 140 is cured by ultra violet ray to be bonded onto one surface of the electroactive layer 120 and has excellent light transmittance. As a result, the contact sensitive device 100 including the bonding layer 140 may be easily applied to a display apparatus.

The bonding layer 140 covers one surface of the electroactive layer 120, and a vibration generated in the electroactive layer 120 may be transmitted through the bonding layer 140. That is, the bonding layer 140 is used as a vibration transmitting layer which transmits a vibration generated in the electroactive layer 120. Specifically, the bonding layer 140 is configured to transmit a vibration component in a direction perpendicular to one surface of the electroactive layer 120 and absorb a vibration component parallel to one surface of the electroactive layer 120, among a vibration generated in the electroactive layer 120, which will be described later with reference to FIG. 3.

The first part 141 and the second part 142 of the bonding layer 140 have different elastic moduli. For example, the elastic modulus of the first part 141 of the bonding layer 140 is higher than the elastic modulus of the second part 142 of the bonding layer 140. For convenience of description, the elastic modulus of the first part 141 is defined as a first elastic modulus and the elastic modulus of the second part 142 is defined as a second elastic modulus.

The elastic modulus means a ratio of a strain with respect to a stress. Therefore, a higher elastic modulus means that deformation of the material at the same stress is smaller. A material having a high elastic modulus is hardly deformed at a large stress, so that rigidity is excellent and the impact applied to the material may be well transmitted to another part of the material.

The first elastic modulus of the first part 141 of the bonding layer 140 and the second elastic modulus of the second part 142 of the bonding layer 140 are determined by a curing degree of the first part 141 and a curing degree of the second part 142. As mentioned above, the bonding layer 140 is formed by, for example, curing a UV curing resin. In this case, the curing degree of the bonding layer 140 varies in individual areas, so that the first part 141 and the second part 142 are formed. That is, the curing degree of the first part 141 and the curing degree of the second part 142 are different from each other.

During the curing process, oligomers included in the resin composition and monomers are polymerized to form a network structure. When the resin composition is sufficiently cured, the polymerized resin has a close network structure with a high elastic modulus, so that deformation due to stress is hardly generated. Further, since the close network structure polymers are strongly coupled, the polymerized resin has an excellent adhesive strength. In contrast, when the resin composition is insufficiently cured, the polymerized resin has a comparatively loose structure with a low elastic modulus, so that deformation due to stress is sufficiently generated, and that the adhesive strength is relatively low.

The curing degree of the bonding layer 140 for individual areas are determined by the energy of a ultra violet ray which is irradiated to cure the UV curing resin. That is, the energy of the ultra violet ray which is irradiated onto the first part 141 of the bonding layer 140 and the energy of the ultra violet ray which is irradiated onto the second part 142 of the bonding layer 140 are adjusted to be different from each other. When a high energy UV ray is irradiated onto the first part 141, a UV curing resin in an area corresponding to the first part 141 is more cured than other part so that a close network structure polymer may be formed in the first part 141. On the other hand, when a low energy UV ray is irradiated onto the second part 142, a UV curing resin in an area corresponding to the second part 142 is less cured than other part so that a loose network structure polymer may be formed in the second part 142.

The elastic modulus of the first part 141 of the bonding layer 140 is higher than the elastic modulus of the second part 142 of the bonding layer 140 so that the first part 141 is cured more than the second part 142. That is, the first part 141 of the polymer which configures the bonding layer 140 has a close network structure and the second part 142 has a loose network structure. As a result, the first elastic modulus of the first part 141 is higher than the second elastic modulus of the second part 142, and an adhesive strength of the first part 141 is larger than an adhesive strength of the second part 142.

The first part 141 of the bonding layer 140 corresponds to the first electrode 130 and transmits vibration of the electroactive layer 120 which is transmitted through the first electrode 130. Specifically, when different voltages are applied to the first electrode 130 and the second electrode 110, an electric field is generated between the first electrode 130 and the second electrode 110. An amount of vibration of the electroactive layer 120 varies depending on the electric field applied between the first electrode 130 and the second electrode 110. The vibration of the electroactive layer 120 is transmitted to the first electrode 130 on one surface and the vibration of the first electrode 130 is transmitted to the first part 141.

The first part 141 of the bonding layer 140 has the first elastic modulus which is higher than the second elastic modulus so that the vibration transmitted through the first electrode 130 is transmitted. For example, the first elastic modulus of the first part 141 may be 20 times to 500 times higher than the second elastic modulus of the second part 142. In this case, the first elastic modulus of the first part 141 and the second elastic modulus of the second part 142 have a large difference. As a result, the vibration which is applied to the first part 141 may be transmitted only through the first part 141, and the vibration of the first part 141 which is transmitted through the second part 142 is reduced or minimized Specifically, the first elastic modulus of the first part 141 beneficially has a value in a range between 10 MPa and 60 MPa.

When the first elastic modulus of the first part 141 of the bonding layer 140 is lower than 10 MPa, the vibration transmitted to the first part 141 may be well transmitted to other part in the first part 141. That is, the material having an elastic modulus lower than 10 MPa may be easily deformed due to stress, and, when vibration is applied, the material absorbs the vibration like rubber. In such a case, the vibration which is transmitted to a part of the material may not be satisfactorily transmitted to the other part. Therefore, the first part 141 beneficially has an elastic modulus equal to or higher than 10 MPa to easily transmit the vibration of the electroactive layer 120. In other words, when the first elastic modulus of the first part 141 is equal to or higher than 10 MPa, the vibration which is transmitted through the first electrode 130 may be sufficiently transmitted to the other part through the first part 141.

Further, when the first elastic modulus of the first part 141 of the bonding layer 140 exceeds 60 MPa, the first part 141 may be easily broken due to vibration. That is, the material having an elastic modulus exceeding 60 MPa may have too strong rigidity so that the material may be brittle. In such a case, when impact is applied, cracks may be easily generated and the material may be easily broken due to the cracks. Therefore, the first part 141 of the bonding layer 140 beneficially has an elastic modulus equal to or lower than 60 MPa so as to appropriately absorb external impact. In other words, when the elastic modulus of the first part 141 is equal to or lower than 60 MPa, the bonding layer 140 may not be easily broken due to impact and durability of the contact sensitive device 100 may not be substantially lowered.

In the meantime, the second part 142 of the bonding layer 140 encloses the first part 141 of the bonding layer 140, as illustrated in FIG. 1, and absorbs the vibration which is transmitted to the outside of the first part 141 through the first part 141. That is, the second part 142 has a second elastic modulus which is lower than the first elastic modulus so as to absorb the vibration which is transmitted through the first part 141 so that the vibration in the first part 141 is suppressed from being transmitted to the outside of the first part 141. Specifically, the second elastic modulus of the second part 142 beneficially has a value in a range between 0.05 MPa and 0.50 MPa.

When the second elastic modulus of the second part 142 exceeds 0.50 MPa, the vibration which is transmitted to the second part 142 may not be fully absorbed but may be transmitted to the other part. As described above, the second part 142 is located between the plurality of first parts 141. When the second elastic modulus of the second part 142 exceeds 0.50 MPa, the vibration which is transmitted to the first part 141 may propagate to other first part 141 through the second part 142. As also described above, the plurality of first parts 141 refer to parts of the bonding layer 140 corresponding to the plurality of tactile cells. As a result, when the vibration generated in the first part 141 is transmitted to the other first parts 141 through the second part 142, the vibration generated in one tactile cell may propagate to other tactile cells. In other words, when the second elastic modulus of the second part 142 exceeds 0.50 MPa, tactile feedback which is subdivided for individual areas may not be transmitted. In contrast, when the second elastic modulus of the second part 142 is equal to or lower than 0.50 MPa, the second part 142 may be easily deformed due to stress like rubber. As a result, the vibration transmitted to the second part 142 may be absorbed by the second part 142, but may not be transmitted to other parts. Therefore, the vibration generated in one tactile cell may not propagate to other tactile cells so that the contact sensitive device 100 may provide tactile feedback which is subdivided for individual areas.

In the meantime, when the second elastic modulus of the second part 142 of the bonding layer 140 is lower than 0.05 MPa, the adhesive strength of the second part 142 is lowered so that the bonding layer 140 may be separated from one surface of the electroactive layer 120. As described above, the second part 142 of the bonding layer 140 is looser than the first part 142, so that the adhesive strength of the second part 142 is lower than that of the first part 142, and that the second part 142 may be easily separated from the one surface of the electroactive layer 120. When the curing degree of the second part 142 is very small, the second elastic modulus of the second part 142 may be lower than 0.05 MPa so that the second part 142 may not have a sufficient adhesive strength, and that the second part 142 may be separated from one surface of the electroactive layer 120. In contrast, when the second elastic modulus of the second part 142 is equal to or higher than 0.05 MPa, the second part 142 may have a sufficient adhesive strength. As the first part 141 has more excellent adhesive strength than the second part 142, an overall adhesive strength of the bonding layer 140 may be increased.

That is, the first elastic modulus of the first part 142 is 20 times or 500 times higher than the second elastic modulus of the second part 142. In this case, the elastic modulus difference between the first part 141 and the second part 142 is sufficient so that the vibration which is applied to the first part may be transmitted only through the first part 141. Further, the vibration which is transmitted to other parts by the second part 142 may be reduced or minimized. By doing this, interferences between adjacent tactile cells may be reduced or minimized.

Also, the first part 141 of the bonding layer 140 is more cured than the other parts, so that the first part has a higher hardness. The second part 142 is less cured than the other parts so that the second part may have a lower hardness. That is, the first part 141 of the polymer which configures the bonding layer 140 has a close and hard structure so that the first part 141 has a higher hardness than the second part 142. Specifically, a pencil hardness of the first part 141 is beneficially 5B or higher and a pencil hardness of the second part 142 is beneficially 3B or lower. The pencil hardness represents a hardness of a specific material with respect to a hardness of a pencil and is determined depending on whether a scratch is generated on the material when a material is scratched by a pencil applied at 45 degrees from a surface of the material.

As described above, the contact sensitive device 100 according to an exemplary embodiment of the present disclosure includes the bonding layer 140 which has the first part 141 having a high elastic modulus and the second part 142 having a lower elastic modulus. Propagation of the tactile feedback generated in a tactile cell to other tactile cells can be reduced or minimized, and a haptic effect which is subdivided for individual areas cab be implemented. A principle of implementing such a haptic effect using the bonding layer 140 will be described in more detail with reference to FIG. 3.

Figure 3:
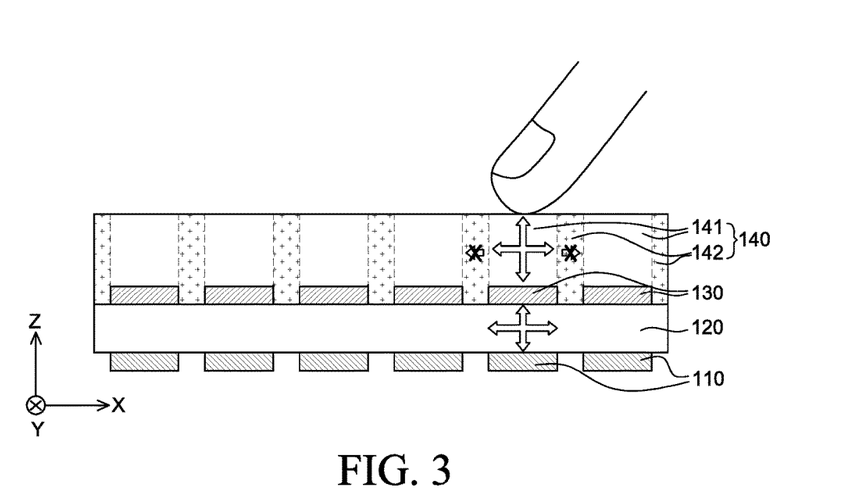
FIG. 3 is a schematic cross-sectional view illustrating a vibration transmitting process of a contact sensitive device according to an exemplary embodiment of the present disclosure.

FIG. 3 is a schematic cross-sectional view illustrating a vibration transmitting process of a contact sensitive device according to an exemplary embodiment of the present disclosure. In FIG. 3, a vibration generation direction is illustrated by an arrow. An arrow illustrated in a horizontal direction indicates a vibration component which vibrates in a direction (that is, in an X-Y plane direction) parallel to one surface of the electroactive layer 120. Further, an arrow illustrated in a vertical direction indicates a vibration component which vibrates in a direction (that is, a Z direction) perpendicular to one surface of the electroactive layer 120.

Referring to FIG. 3, when a voltage is applied between a specific first electrode 130 and a specific second electrode 110, a vibration is generated in a specific tactile cell in which the specific first electrode 130 and the specific second electrode 110 overlap. The vibration generated in the electroactive layer 120 includes a component which vibrates in a direction parallel to one surface of the electroactive layer 120 and a component which vibrates in a direction perpendicular to one surface of the electroactive layer 120. The vibration of the electroactive layer 120 is transmitted to the first part 141 of the bonding layer 140 through the first electrode 130.

As described above, since the elastic modulus of the first part 141 is high, the vibration which is transmitted through the first electrode 130 is transmitted to surroundings of the first part 141 through the first part 141. A part of the vibration transmitted to the first part 141 is transmitted to the second part 142 which encloses the first part 141 due to the high elastic modulus of the first part 141. Also, since the elastic modulus of the second part 141 is low, the second part 142 absorbs the vibration transmitted through the first part 141. That is, when the vibration is transmitted to the second part 141 through the first part 141, the polymer of the second part 142 may be partially deformed and may not transmit the vibration. In other words, when the vibration is transmitted to the second part 141 through the first part, a surface of the second part 141 which is in contact with the first part 141 may be crushed like rubber due to the low elastic modulus of the second part 141 and the vibration may be absorbed due to the deformation of the second part 141. Specifically, the vibration component of the direction parallel to one surface of the electroactive layer 120 may be absorbed by the second part 142, so that the vibration generated in the specific tactile cell may not propagate to other surrounding tactile cells, and that the tactile feedback may be transmitted only through the specific tactile cell. As a result, the user may feel the vibration only in the specific tactile cell and vibration interference by which vibration propagates to other tactile cells may be reduce or minimized.

Hereinafter, an improved tactile feedback transmitting effect of the contact sensitive device according to an exemplary embodiment of the present disclosure will be described with reference to FIGS. 4A and 4B.

Figure 4A:
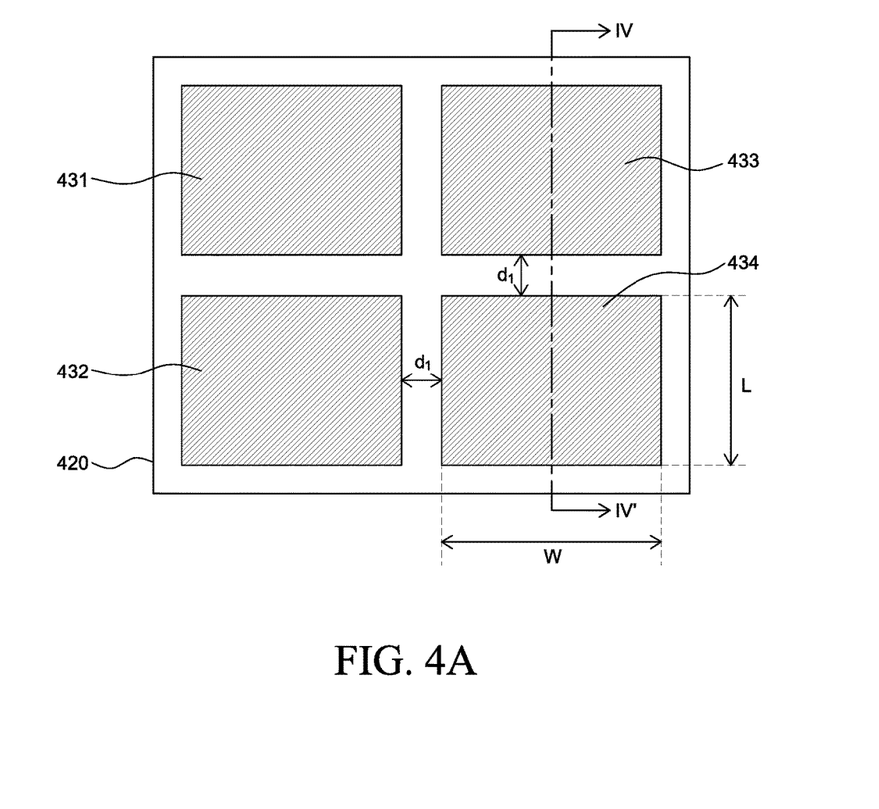
FIG. 4A is a schematic plan view of a contact sensitive device according to a comparative embodiment.

FIG. 4A is a schematic plan view of a contact sensitive device according to a comparative embodiment. FIG. 4B is a schematic cross-sectional view of the contact sensitive device taken along line IV-IV' of FIG. 4A.

A contact sensitive device according to a comparative embodiment is manufactured for a comparison test of an improved tactile feedback transmitting effect of a contact sensitive device according to an exemplary embodiment of the present disclosure.

As illustrated in FIG. 4A, a contact sensitive device according to a comparative embodiment includes four tactile cells. Four tactile cells correspond to regions where a first sub electrode 431, a second sub electrode 432, a third sub electrode 433, and a fourth sub electrode 434 are disposed, respectively. The first sub electrode 431, the second sub electrode 432, the third sub electrode 433, and the fourth sub electrode 434 are disposed on one surface of the electroactive layer 420. All distances $d_1$ between the first sub electrode 431, the second sub electrode 432, the third sub electrode 433, and the fourth sub electrode 434 are 1 mm. A width W of each of the first sub electrode 431, the second sub electrode 432, the third sub electrode 433, and the fourth sub electrode 434 is 4 cm and a length L is 6 cm.

Figure 4B:
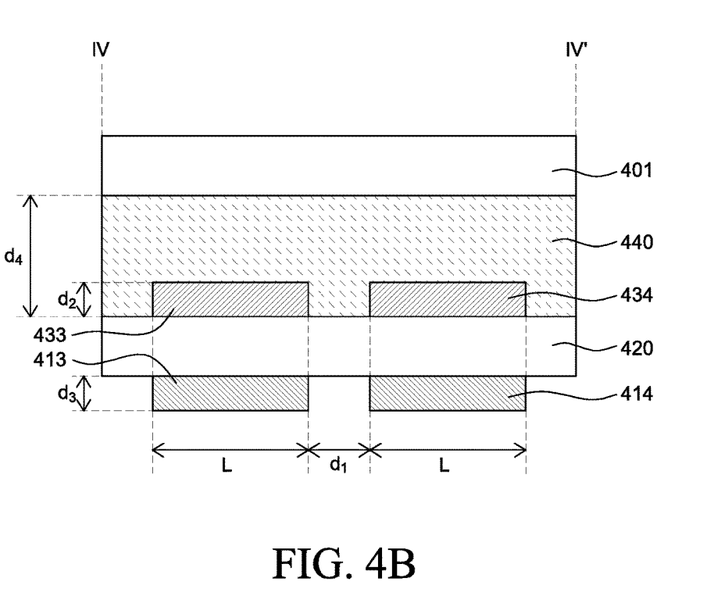
FIG. 4B is a schematic cross-sectional view of a contact sensitive device taken along line IV-IV' of FIG. 4A.

As illustrated in FIG. 4B, the contact sensitive device according to the comparative embodiment includes a fifth sub electrode, a sixth sub electrode, a seventh sub electrode 413, and an eighth sub electrode 414 formed on other surface of the electroactive layer 120 so as to correspond to the first sub electrode 431, the second sub electrode 432, the third sub electrode 433, and the fourth sub electrode 434 in one to one correspondence. The first to eighth sub electrodes 431, 432, 433, 434, 413, and 414 have the same thickness $d_3$, which is 20 nm, respectively. All the first to eighth sub electrodes 431, 432, 433, 434, 413, and 414 are formed of ITO.

A PVDF film having a thickness of 80 μm is used as an electroactive layer 420 of the contact sensitive device according to the comparative embodiment.

The contact sensitive device according to the comparative embodiment includes a transparent bonding layer 440 on the electroactive layer 420 to cover the first to fourth sub electrodes 431, 432, 433, and 434. A product No. OA9052T manufactured by LG Chem. Ltd., is used to form the transparent bonding layer 440 having a thickness of 50 μm. An elastic modulus of the transparent bonding layer 440 is 0.3 MPa.

In the meantime, the contact sensitive device according to the comparative embodiment includes a cover substrate 401 which is attached to the transparent bonding layer 440. A glass substrate having a thickness of 0.7 mm is used as the cover substrate 401.

As compared with the contact sensitive device according to the comparative embodiment illustrated in FIGS. 4A and 4B, a contact sensitive device according to the exemplary embodiment of the present disclosure includes a bonding layer instead of the transparent bonding layer 440. The bonding layer is formed to have a thickness of 75 μm. The bonding layer includes a first part which has an elastic modulus of 10 MPa and corresponds to a region where the first to fourth sub electrodes 431, 432, 433, and 434 are disposed and a second part which has an elastic modulus of 0.03 MPa and corresponds to a region excluding the region where the first to fourth sub electrodes 431, 432, 433, and 434 are disposed. The bonding layer is formed by curing an acrylate based UV curing resin in individual areas with different energy. Specifically, the first part of the bonding layer is cured using an UV ray having energy of 5000 $mJ/cm^2$ and the second part of the bonding layer is cured using an UV ray having energy of 400 $mJ/cm^2$. Other characteristics of the bonding layer are equal to characteristics of the bonding layer 140 which has been described with reference to FIGS. 1 to 3.

A same driving voltage is applied to the contact sensitive device according to the exemplary embodiment of the present disclosure and the contact sensitive device according to the comparative embodiment. Specifically, 750 V of AC voltage which has a sine waveform and has a frequency of 100 Hz is applied between the first sub electrode 431 and the fifth sub electrode. Hereinafter, test results of the contact sensitive device according to the exemplary embodiment of the present disclosure and the contact sensitive device according to the comparative embodiment will be described with reference to Table 1.

Table 1 shows the test results obtained by measuring a vibration acceleration of the contact sensitive device according to the exemplary embodiment and the contact sensitive device according to the comparative embodiment.

TABLE 1

| Classification | Tactile cell to which voltage is applied (first sub electrode 431) | Tactile cell to which voltage is not applied (fourth sub electrode 434) |
|---|---|---|
| Comp. Ex. | 0.43 G | 0.31 G |
| Ex. | 0.69 G | 0.18 G |

Referring to Table 1, in the contact sensitive device according to the comparative embodiment, a vibration of 0.43 G is detected in the tactile cell corresponding to the first sub electrode 431 to which the driving voltage is applied. Further, a vibration of 0.31 G is detected in the tactile cell corresponding to the fourth sub electrode 434 to which the driving voltage is not applied. That is, in the contact sensitive device according to the comparative embodiment, the vibration of the tactile cell to which the driving voltage is applied propagate to the tactile cells to which the driving voltage is not applied.

In contrast, in the contact sensitive device according to the exemplary embodiment of the present disclosure, a vibration of 0.69 G is detected in the tactile cell corresponding to the first sub electrode 431 to which the driving voltage is applied. However, a vibration of 0.18 G is detected in the tactile cell corresponding to the fourth sub electrode 434 to which the driving voltage is not applied. That is, in the contact sensitive device according to the exemplary embodiment of the present disclosure, the bonding layer absorbs the vibration so that propagation of the vibration of the tactile cell, to which the driving voltage is applied, to the tactile cell, to which the driving voltage is not applied, is reduced or minimized.

The contact sensitive device according to the exemplary embodiment of the present disclosure includes the bonding layer which has different elastic moduli in individual areas, so that tactile feedback which is subdivided for individual areas may be transmitted. That is, in the case of the contact sensitive device according to the comparative embodiment, the tactile feedback generated in the tactile cell of a region where the first sub electrode 431 is disposed is transmitted to the tactile cell of a region where the fourth sub electrode 434 is disposed. A vibration of 0.31 G is detected in the tactile cell in a region where the fourth sub electrode 434 is disposed. In contrast, in the case of the contact sensitive device according to the exemplary embodiment of the present disclosure, the tactile feedback generated in the tactile cell of a region where the first sub electrode 431 is disposed is rarely transmitted to the tactile cell of a region where the fourth sub electrode 434 is disposed. A vibration of 0.18 G is detected in the tactile cell in a region where the fourth sub electrode 434 is disposed. Therefore, in the contact sensitive device according to the exemplary embodiment of the present disclosure, propagation of the vibration of the specific tactile cell to adjacent tactile cell is reduced or minimized, and the tactile feedback is more independently transmitted to subdivided individual areas.

Figure 5:
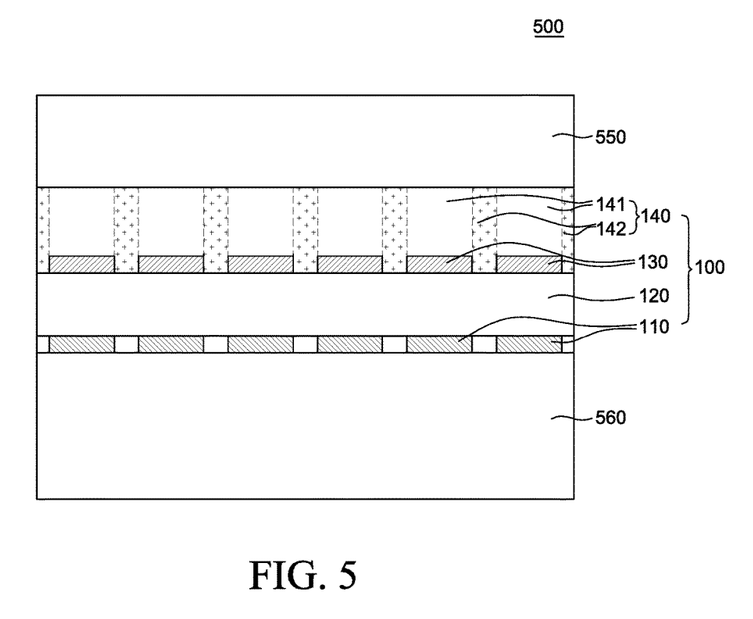
FIG. 5 is a schematic cross-sectional view of a display apparatus according to an exemplary embodiment of the present disclosure.

FIG. 5 is a schematic cross-sectional view of a display apparatus according to an exemplary embodiment of the present disclosure.

Referring to FIG. 5, the display apparatus 500 includes a display panel 560, a contact sensitive device 100, and a touch device 550. In FIG. 5, specific configurations of the touch device 550 and the display panel 560 which are disposed above and below the contact sensitive device 100 are not specifically illustrated for convenience of description.

The display panel 560 refers to a panel in which a display device to display an image is disposed in the display apparatus 500. Various types of display panels such as an organic light emitting display panel, a liquid crystal display panel, or an electrophoretic display panel may be used as the display panel 560. The touch device 550 refers to a panel which detects touch inputs of the user on the display apparatus 500. For example, a capacitive type, a resistive type, a surface acoustic wave type, an infrared ray type touch device, or the like, may be used as the touch device 550. A capacitive type touch device may be beneficially used for the touch device 550. In the display apparatus 500 according to the exemplary embodiment of the present disclosure, the touch device 550 is formed to be one body with a cover window. That is, the touch electrode is formed on a rear surface of the cover window and the cover window functions as a cover substrate of the touch device 550 which protects the touch electrode.

The bonding layer 140 of the contact sensitive device 100 bonds the electroactive layer 120 and the touch device 550. As described above, the bonding layer 140 is formed using a UV curing resin and has an excellent adhesive strength. The UV curing resin for forming the bonding layer 140 is cured between the electroactive layer 120 and the touch device 550 and bonds the electroactive layer 120 and the touch device 550.

The contact sensitive device 100 has a predetermined adhesive strength to bond the electroactive layer 120 and the touch device 550. For example, the contact sensitive device 100 has an adhesive strength of 4 N/cm$^2$ or higher. Here, the adhesive strength of the contact sensitive device 100 is defined by a strength of shear stress for a unit area at the moment when the adhesion between the electroactive layer 120 and the touch device 550 is separated when shear stress is applied to the electroactive layer 120 and the touch device 550. Because the curing degrees of the first part 141 and the second part 142 in the bonding layer 140 are different from each other, the adhesive strength of the first part 141 and the adhesive strength of the second part 142 may be different from each other. However, the adhesive strength of the bonding layer 140 may be beneficially maintained to be 4 N/cm$^2$ or higher on average. In this case, the bonding layer 140 may stably bond the touch device and the electroactive layer 120.

Further, the bonding layer 140 beneficially has a thickness enough to easily transmit the vibration of the electroactive layer 120 and reduce or minimize reduction of visibility of the display apparatus 500. For example, the thickness of the bonding layer 140 is beneficially in a range of 20 μm to 100 μm. When the thickness of the bonding layer 140 is smaller than 20 μm, the second part 142 of the bonding layer 140 may not sufficiently absorb the vibration. In this case, the vibration generated in the specific tactile cell may propagate to other tactile cells, and thus, the tactile feedback which is subdivided for individual areas may not be satisfactorily transmitted. Further, when the thickness of the bonding layer 140 exceeds 100 μm, the visibility may be reduced due to the bonding layer 140. That is, even though the bonding layer 140 has an excellent transmittance, when the thickness is too large, the visibility may be reduced due to the bonding layer 140. Therefore, the thickness of the bonding layer 140 may be selected in a range between 20 μm and 100 μm so that the bonding layer 140 sufficiently absorbs the vibration generated in the specific tactile cell, thereby reducing or minimizing interference of the tactile feedback and reduction of visibility of the display apparatus 500.

The display apparatus 500 according to the exemplary embodiment of the present disclosure includes the bonding layer 140 which bonds the electroactive layer 120 and the touch device 550. Therefore, the contact sensitive device 100 may be bonded to the touch device 550 without using an additional bonding member. Specifically, the bonding layer 140 includes the first part 141 corresponding to the first electrode 130 and the second part 142 which encloses the first part 141 and the first part 141 has a first elastic modulus which is higher than a second elastic modulus of the second part 142. Therefore, the tactile feedback of the specific tactile cell which is transmitted through the first electrode 130 is absorbed by the second part 142 of the bonding layer 140 and the tactile feedback generated in one tactile cell may be rarely transmitted to other tactile cells. As a result, the display apparatus 500 according to the exemplary embodiment of the present disclosure may transmit a tactile feedback which is subdivided for individual areas and provide various haptic effects.

Figure 6:
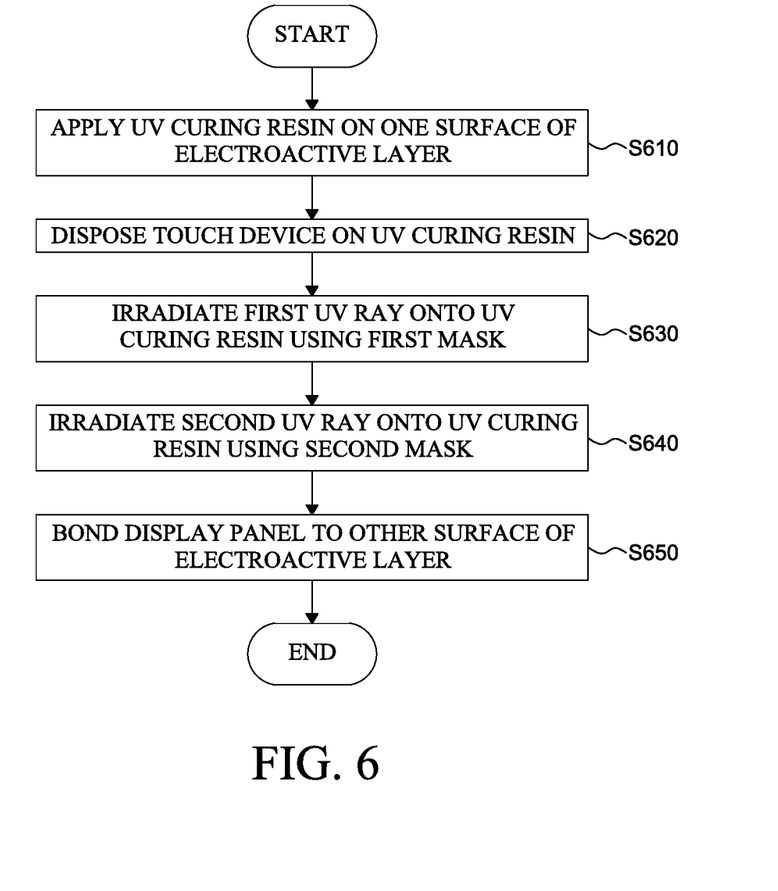
FIG. 6 is a flowchart illustrating a method of manufacturing a display apparatus according to an exemplary embodiment of the present disclosure.
Figure 7A:
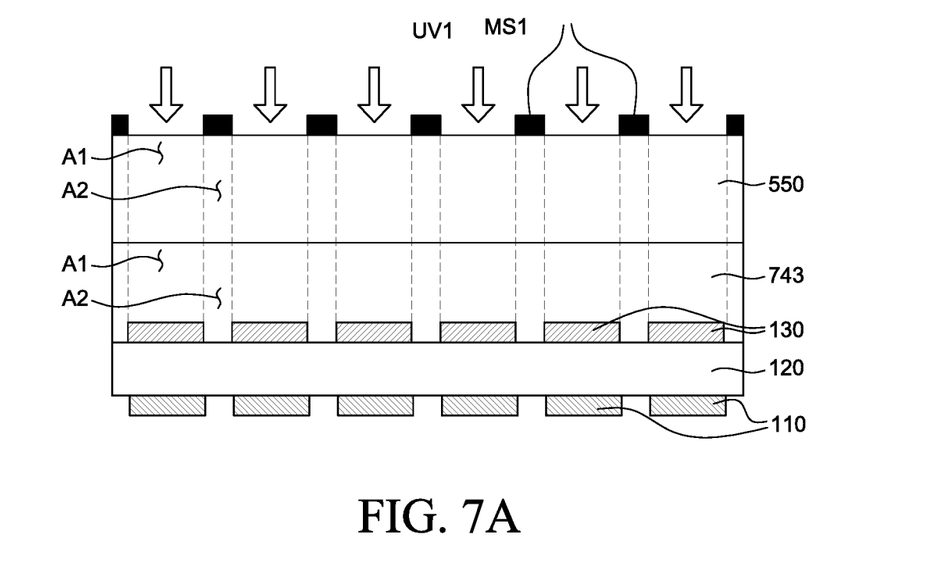
FIGS. 7A to 7C are cross-sectional views illustrating processes of a method of manufacturing a display apparatus according to an exemplary embodiment of the present disclosure.
Figure 7B:
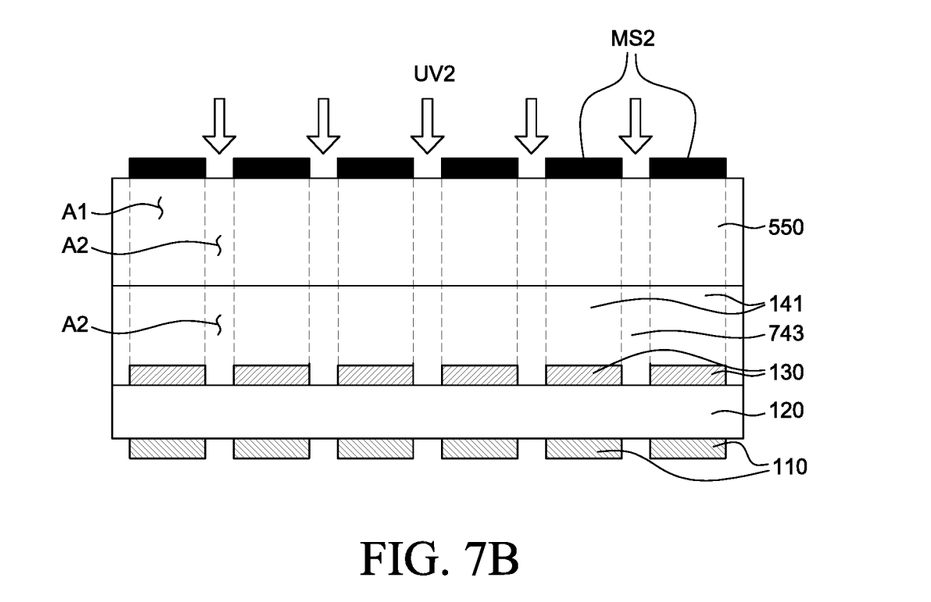
Figure 7C:
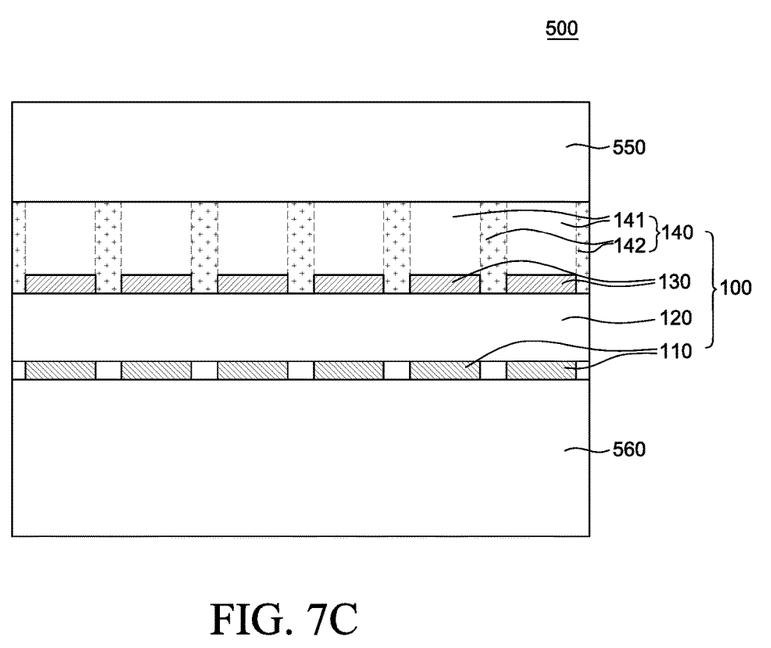

FIG. 6 is a flowchart illustrating a method of manufacturing a display apparatus according to an exemplary embodiment of the present disclosure. FIGS. 7A to 7C are cross-sectional views illustrating processes of a method of manufacturing a display apparatus according to an exemplary embodiment of the present disclosure. Specifically, FIGS. 7A to 7C are cross-sectional views for explaining a method of manufacturing a display apparatus 500 illustrated in FIG. 5.

First, a UV curing resin is applied on one surface of an electroactive layer to cover an electrode disposed on one surface of the electroactive layer in step S610.

Referring to FIG. 7A, electrodes are formed on both surfaces of the electroactive layer 120. For example, a first electrode 130 is formed on one surface of the electroactive layer 120 and a second electrode 110 is formed on the other surface of the electroactive layer 120. The first electrode 130 and the second electrode 110 may be formed on both surfaces of the electroactive layer 120 by a sputtering method, a printing method, a slit coating method, or the like.

A UV curing resin 743 is applied to cover the first electrode 130 disposed on one surface of the electroactive layer 120. The UV curing resin 743 includes an oligomer, a monomer, and a photo initiator. Types of oligomer, monomer and photo initiator are not specifically limited, and various UV curing resin compositions which have excellent light transmittance and adhesive strength may be used.

Next, a touch device which faces the electroactive layer is disposed on the UV curing resin in step S620.

Referring to FIG. 7A, the touch device 550 is disposed to face the electroactive layer 120. The touch device 550 covers the UV curing resin 743 and a rear surface of the touch device 550 is in contact with the UV curing resin 743.

Next, a UV ray having a first energy is irradiated onto the UV curing resin using a first mask which exposes the first area corresponding to the electrode in step S630.

Referring to FIG. 7A, the first mask MS1 is disposed on the touch device 550. The first mask MS1 exposes the first area A1 corresponding to the first electrode 139 and blocks a second area A2 excluding the first area A1. As the first mask MS1, a shadow mask having an opening through which the first area A1 is exposed may be used. In some exemplary embodiments, the first mask MS1 may be a photoresist mask which is patterned through a photolithography process. In this case, the photoresist corresponding to the first area A1 is selectively removed through the photolithography process so that the first mask MS1 may be formed on an upper surface of the touch device.

A UV ray UV1 having a first energy is irradiated on the first area A1 which is exposed through the first mask MS1. As described above, the first part of the bonding layer corresponding to the first electrode 130 has a high elastic modulus, so that the UV ray UV1 having a first energy which is relatively high may be irradiated on the first area A1. When the UV ray UV1 having a first energy is irradiated on the first area, the UV curing resin 743 of the first area is sufficiently cured, so that a close network structure polymer may be formed. Therefore, the UV curing resin 743 in the first area A1 may have a high elastic modulus. The UV ray UV1 having a first energy has energy of 5000 mJ/cm$^2$ or higher. In this case, the UV curing resin 743 may be cured to have an elastic modulus of 10 MPa or higher.

Next, a UV ray having a second energy which is lower than the first energy is irradiated on the UV curing resin using a second mask which exposes the second area excluding the first area in the area corresponding to one surface of the electroactive layer in step S640.

Referring to FIG. 7B, after completing the curing process on the first area A1, the first mask is removed and the second mask MS2 is disposed on the touch device 550. The second mask MS2 covers the first area A1 and exposes the second area A2 excluding the first area A1. Similar to the first mask MS1, the second mask MS2 may be configured by a shadow mask or a photoresist.

A UV ray UV2 having a second energy which is lower than the first energy is irradiated on the second area A2 which is exposed through the second mask MS2. As described above, the second area A2 of the bonding layer has a lower elastic modulus than the first part 141, so that the UV ray UV2 having a second energy which is low may be irradiated on the second area A2. When the UV ray UV2 having a second energy which is low is irradiated on the second area A2, the UV curing resin 743 may be slightly cured in the second area A2. Therefore, a comparatively loose network structure polymer may be formed and the UV curing resin 743 of the second area A2 may have a low elastic modulus. The UV ray UV2 having the second energy which is low has energy of 500 mJ/cm$^2$ or low. In this case, the UV curing resin 743 may be cured to have an elastic modulus of 0.1 MPa or lower. That is, the UV ray UV2 having a second energy has energy which is 1/10 of the first energy of the UV ray UV1. In other words, the first energy of the UV ray UV1 is, for example, 10 times higher than the second energy of the UV ray UV2.

Next, the display panel is bonded onto the other surface of the electroactive layer in step S650.

Referring to FIG. 7C, the contact sensitive device 100 which is coupled to the touch device 550 is bonded to the display panel 560. For example, a bonding material is applied on a lower surface of the electroactive layer 120 to cover the second electrode so that the contact sensitive device 100 and the display panel 60 are bonded to each other. A super view resin (SVR) or optical clear adhesive (OCA) having excellent transmittance may be used as the bonding material, but the bonding material is not limited thereto.

As described above, the first part 141 and the second part 142 of the bonding layer 140 are formed through two curing processes using the first mask MS1 and the second mask MS2. The first part 141 and the second part 142 of the bonding layer 140 have different elastic moduli so that propagation of the tactile feedback generated in a specific tactile cell to other tactile cells may be reduced or minimized. Also, because the bonding layer 140 having different elastic moduli can be formed of one UV curing resin, the bonding layer 140 is formed by a simple process and the display apparatus 500 including a contact sensitive device 100 which provides independent tactile feedback may be easily manufactured.

According to an aspect of the present disclosure, a contact sensitive device includes an electroactive layer, a plurality of first electrodes, a plurality of second electrodes, and a bonding layer. The bonding layer covers one surface of the electroactive layer and includes a first part corresponding to the plurality of first electrodes and a second part excluding the first part. The first part and the second part of the bonding layer have different elastic moduli.

The first part and the second part may be one continuous layer.

An elastic modulus of the first part may be higher than an elastic modulus of the second part.

An elastic modulus of the first part may be 20 to 500 times higher than an elastic modulus of the second part.

An elastic modulus of the first part may be 10 MPa to 60 MPa.

An elastic modulus of the second part may be 0.05 MPa to 0.50 MPa.

A pencil hardness of the first part may be 5B or higher and a pencil hardness of the second part may be 3B or lower.

The first part of the bonding layer may correspond to an overlapping area where the plurality of first electrodes and the plurality of second electrodes overlap.

According to an aspect of the present disclosure, a display apparatus includes a display panel, a contact sensitive device and a cover window. The contact sensitive device includes a bonding layer consists of a first part disposed between the first electrode of the contact sensitive device and the cover window and a second part disposed between one surface of the electroactive layer and the cover window. The first part and the second part of the bonding layer have different elastic moduli.

An elastic modulus of the first part may be higher than an elastic modulus of the second part.

An elastic modulus of the first part may be 20 to 500 times higher than an elastic modulus of the second part.

An adhesive strength of the bonding layer may be 4 N/cm$^2$ or higher.

A thickness of the bonding layer may be 20 μm to 100 μm.

The display apparatus may further include a touch device between the contact sensitive device and the cover window, between the contact sensitive device and the display panel, or in the display panel.

According to an aspect of the present disclosure, a method of manufacturing a display apparatus includes applying a ultra violet (UV) curing resin onto one surface of an electroactive layer to cover an electrode disposed on one surface of the electroactive layer, disposing a touch device which faces the electroactive layer, on the UV curing resin, irradiating a UV ray having first energy onto the UV curing resin using a first mask which exposes the first area corresponding to the electrode, irradiating a UV ray having second energy which is lower than the first energy onto the UV curing resin using a second mask which exposes the second area excluding the first area in the area corresponding to one surface of the electroactive layer, and bonding a display panel onto the other surface of the electroactive layer.

The irradiating of a UV ray having first energy onto the UV curing resin includes irradiating an UV ray having first energy which is, for example, 10 times higher than the UV ray having second energy.

Although the exemplary embodiments of the present disclosure have been described in detail with reference to the accompanying drawings, the present disclosure is not limited thereto and may be embodied in many different forms without departing from the technical concept of the present disclosure. Therefore, the exemplary embodiments of the present disclosure are provided for illustrative purposes only but not intended to limit the technical spirit of the present disclosure. The scope of the technical concept of the present disclosure is not limited thereto. Therefore, it should be understood that the above-described exemplary embodiments are illustrative in all aspects and do not limit the present disclosure. The protective scope of the present

What is claimed is:

1. A contact sensitive device, comprising:
   an electroactive layer;
   a plurality of first electrodes on one surface of the electroactive layer;
   a plurality of second electrodes on another surface of the electroactive layer; and
   a bonding layer on the one surface of the electroactive layer, the bonding layer including a first part corresponding to the plurality of first electrodes and a second part excluding the first part,
   wherein the first part and the second part have different elastic modulus.

2. The contact sensitive device according to claim 1, wherein the first part and the second part are one continuous layer.

3. The contact sensitive device according to claim 1, wherein an elastic modulus of the first part is higher than an elastic modulus of the second part.

4. The contact sensitive device according to claim 1, wherein an elastic modulus of the first part is 20 to 500 times higher than an elastic modulus of the second part.

5. The contact sensitive device according to claim 1, wherein an elastic modulus of the first part is 10 MPa to 60 MPa.

6. The contact sensitive device according to claim 5, wherein an elastic modulus of the second part is 0.05 MPa to 0.50 MPa.

7. The contact sensitive device according to claim 6, wherein a pencil hardness of the first part is 5B or higher and a pencil hardness of the second part is 3B or lower.

8. The contact sensitive device according to claim 1, wherein the first part of the bonding layer corresponds to an overlapping area where the plurality of first electrodes and the plurality of second electrodes overlap with each other.

9. A display apparatus, comprising:
   a display panel;
   a contact sensitive device on the display panel, the contact sensitive device including an electroactive layer, a first electrode on one surface of the electroactive layer, and a bonding layer on the first electrode; and
   a cover window on the contact sensitive device,
   wherein the bonding layer includes a first part between the first electrode and the cover window and a second part between the one surface of the electroactive layer and the cover window, and
   wherein the first part and the second part have different elastic moduli.

10. The display apparatus according to claim 9, wherein an elastic modulus of the first part is higher than an elastic modulus of the second part.

11. The display apparatus according to claim 9, wherein an elastic modulus of the first part is 20 to 500 times higher than an elastic modulus of the second part.

12. The display apparatus according to claim 9, wherein an adhesive strength of the bonding layer is 4 N/cm$^2$ or higher.

13. The display apparatus according to claim 9, wherein a thickness of the bonding layer is 20 μm to 100 μm.

14. The display apparatus according to claim 9, further comprising:
   a touch device between the contact sensitive device and the cover window, between the contact sensitive device and the display panel, or in the display panel.

* * * * *